INVENTORS
NORMAN L. CRABILL
JOHN M. RIEBE

Sept. 6, 1966   N. L. CRABILL ETAL   3,270,505
CONTROL SYSTEM FOR ROCKET VEHICLES
Filed Oct. 21, 1964   2 Sheets-Sheet 2

INVENTORS
NORMAN L. CRABILL
JOHN M. RIEBE

BY

ATTORNEYS

United States Patent Office 3,270,505
Patented Sept. 6, 1966

3,270,505
CONTROL SYSTEM FOR ROCKET VEHICLES
Norman L. Crabill and John M. Riebe, Newport News, Va., assignors to the United States of America as represented by the Administrator of the National Aeronautics and Space Administration
Filed Oct. 21, 1964, Ser. No. 405,632
11 Claims. (Cl. 60—35.55)

The invention described herein may be manufactured and used by or for the Government of the United States of America for governmental purposes without the payment of any royalties thereon or therefor.

This invention relates generally to a reaction propulsion motor and more particularly to aerodynamic control of an exhaust stream nozzle.

The advent of high speed and performance aircraft vehicles has brought methods and devices with it for controlling and guiding the vehicle. In order to obtain the high speeds desired, jet engines and rocket motors have had to perform with exhaust stream temperatures and velocities greatly in excess of those previously known. Tests accompanying development of the high speed aircraft have clearly established the inadequacy of the normal control surfaces of the aircraft for guidance. To overcome this inadequacy, it became necessary to provide devices such as jet vanes, jetavators, and gimballed engines or nozzles that use hydraulic or pushrod methods for actuation thereof. Thrust vector control, altering the direction of the exhaust stream, has proven to be sufficient for guidance of the vehicle but has resulted in many difficulties. Devices, such as jetavators or gimbals, not only require development of materials capable of withstanding the high temperatures encountered, but also are difficult to fabricate. A further difficulty arises due to the increased weight and size of these devices which necessarily require that a larger propulsion unit be provided for overcoming the deficiencies.

The present invention overcomes the difficulties of the prior art by providing a control system which utilizes secondary injection of a fluid into the exhaust stream. The secondary injection hardware is located on a swiveling nozzle, so as to provide inertial lag of the system when the vehicle is disturbed.

It is an object of the instant invention to provide an improved system for stability and control on rocket vehicles.

Another object of this invention is to provide efficient thrust vectoring by secondary injection in a rocket nozzle.

A further object of the invention is to provide secondary injection for control of rocket nozzle.

A still further object of this invention is to provide control of a rocket nozzle by secondary injection of a fluid into the exhaust stream to cause jet vectoring and nozzle deflection.

Another object of the instant invention is to provide stabilization for a rocket nozzle by location of secondary injection equipment in a manner to obtain inertial lag of the control system when the rocket is disturbed.

A further object of this invention is to provide nozzle position control by secondary injection.

Still another object of the instant invention is to provide thrust vector control of a swiveling rocket nozzle wherein the controlling forces are magnified to enhance the thrust vectoring.

Generally the foregoing and other objects are accomplished by locating a swiveling nozzle adjacent the outlet of a jet engine or rocket thrust chamber. The nozzle is pivotally supported rearward, or downstream, of the center of gravity, but forward of the nozzle center of pressure, and has injection ports located between the pivotal connections and the center of gravity or slightly upstream of the pivot connection. A gas generator or high pressure fluid container is connected to the ports by a conduit to provide the secondary injection fluid. This secondary injection hardware is located on the nozzle so as to maintain the center of gravity of the nozzle upstream of the pivotal connection. A seal extends between the reaction propulsion motor and the hardware or nozzle structure and a conventional vibration damper is provided to overcome undesirable movement of the nozzle.

A more complete appreciation of the invention and many of the attendant advantages thereof will be readily apparent as the same becomes better understood by reference to the following detailed description when considered in connection with the accompanying drawings wherein.

Figure 1:
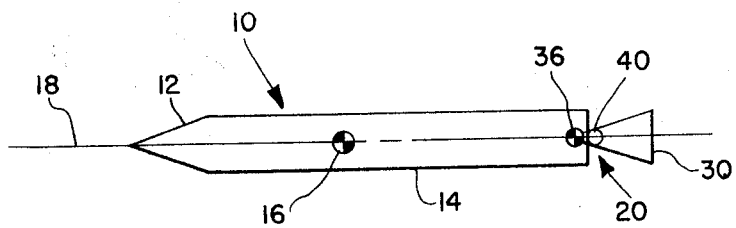
FIG. 1 is a diagrammatic view of an aircraft in a static state which employs the instant invention.

Referring now to the drawing wherein like reference numerals designate identical or corresponding parts throughout the several views, and more particularly to FIG. 1 wherein an aircraft or space vehicle, generally designated by numeral 10, is shown as having forward payload 12 of conical configuration and main body 14. Center of gravity 16 is on centerline 18 of aircraft 10 which includes after propulsion unit 20 having nozzle 30 with center of gravity 36 and pivot mount 40.

Figure 2:
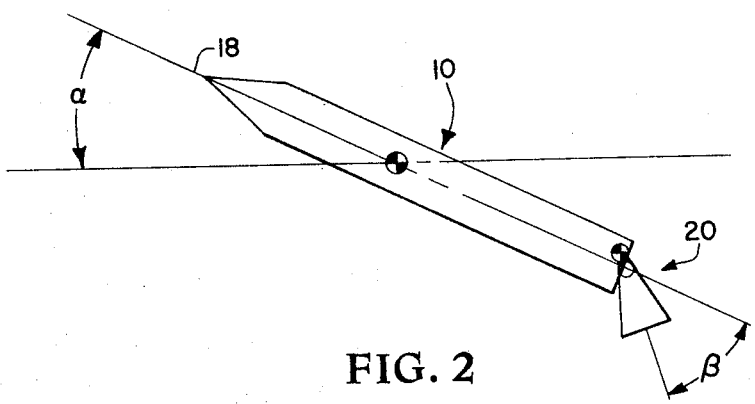
FIG. 2 is a diagrammatic view of an aircraft in a dynamic state which shows the effect of the instant invention on the nozzle.

Aircraft 10 is shown in a dynamic condition in FIG. 2. Angle-of-attack alpha designates the angular relation between the indicated flightpath and centerline 18 of aircraft 10 caused by some aerodynamic disturbance or steering command. Propulsion unit 20 is shown at angle beta from centerline 18 which is substantially the position necessary for returning the vehicle to its intended flightpath.

Figure 3:
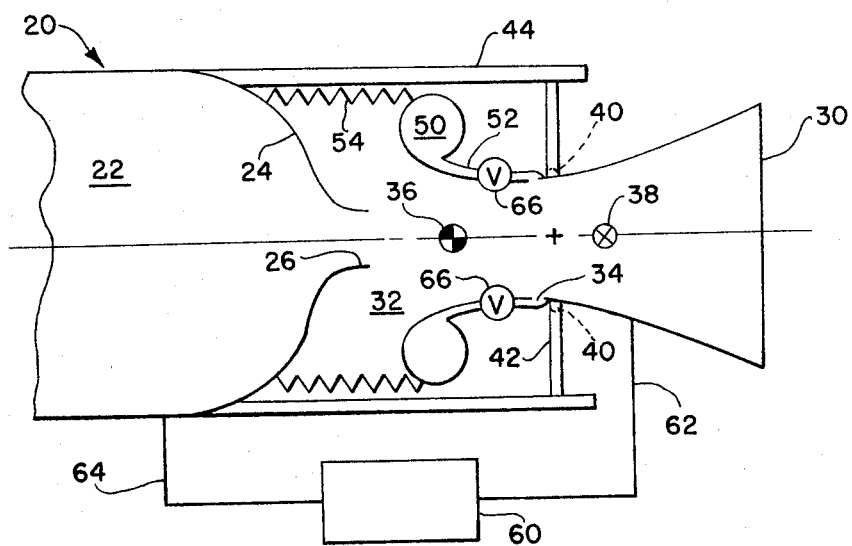
FIG. 3 is an enlarged diagrammatic view of the after portion of an aircraft embodying the instant invention.

A diagrammatic view of a typical construction embodying the concept of the instant invention is shown in FIG. 3. Propulsion unit 20 has a conventional reaction motor 22, such for example as a jet engine or rocket thrust chamber. The after portion of reaction motor 22 converges at 24 to form throat 26. Nozzle 30 is mounted aft of and surrounding throat or exhaust port 26 at constricted inlet 32. As shown in FIG. 3, nozzle 30 has center of gravity 36 located forward and near inlet 32 and center of pressure 38 located in the divergent after portion of the high expansion ratio configuration shown. Such a configuration is well established to be of efficient form for use especially in the outer regions of space wherein there is a substantial vacuum and hence a lack of back pressure.

Still referring to FIG. 3, nozzle 30 is shown as being swivelly mounted by pivot mount 40 which is attached to link or flange 42 extending from support frame 44. Support frame 44 may be part of the framework of aircraft 10 or a fixed structure having a definite relation to nonmovable reaction motor 22.

In order to obtain the desired control a secondary injection system is provided for command maneuvers. Nozzle ports 34 are shown as located between pivotal mount 40 and nozzle center of gravity 36 and function to permit injection of a fluid into the exhaust stream from reaction motor 22. Conduit 52 connects ports 34 and gas generator or fluid valve 50. Gas generator 50 and conduit 52 extend forward from ports 34 to add weight to nozzle 30 adjacent throat 32 and, therefore, assist in locating center of gravity 36 forward of nozzle mount 40.

Figure 4:
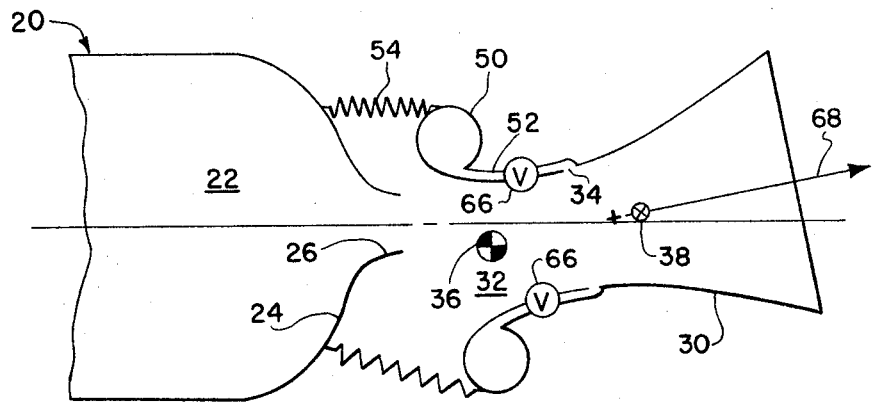
FIG. 4 is a diagrammatic view of a nozzle employing the instant invention in a condition wherein control is not required.
Figure 5:
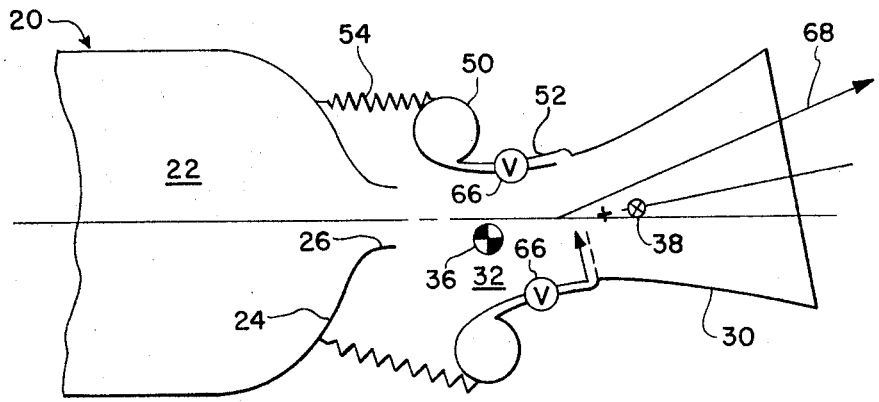
FIG. 5 is a diagrammatic view of the after portion of an aircraft utilizing the instant invention during a control condition.

The space between exhaust port 26 of reaction motor 22 and throat 32 of nozzle 30 would have a tendency to cause turbulent flow and large pressure loss of the exhaust stream in the absence of some type of closure structure. Accordingly, seal 54 is provided to maintain an undisturbed exhaust flow. Although seal 54 is shown in FIGS. 3, 4 and 5 as being of bellows construction and extending between gas generator 50 and reaction motor 22, it is to be understood that any conventional seal may be utilized which does not necessarily have to extend between those specific elements as shown.

During flight and operation of reaction motor 22 nozzle 30 may have a tendency to vibrate. In order to overcome such vibrations, vibration damper 60 is provided. Damper 60 may be of conventional construction, for example of the dashpot type, connected to nozzle 30 by linkage 62 and to vehicle support structure 44 by linkage 64.

*Operation*

The invention relates primarily to the control of a nozzle and its associated reaction motor for guidance during flight. FIG. 4 shows a typical construction for the instant invention in a substantially stable state when it is unnecessary to provide secondary injection to control the rocket or aircraft. The location of gas generator 50, conduit 52 and bellows 54 adds weight to nozzle 30 forward of pivotal mount 40 and thereby assists in positioning center of gravity 36 between the pivotal or swiveling mount and reaction motor 22. Thus, during a disturbance, the aircraft acceleration interacts with the location of center of gravity 36 to cause nozzle 30 to be deflected in a way to reduce angle alpha, FIGURE 2. In space the arrangement can be made to provide automatic trimming of the space vehicle in response to external torques, including nozzle thrust misalinements. In the case where an aerospace vehicle is anticipated to be unstable, the nozzle hardware would be positioned to locate the center of gravity downstream of the pivot mount and thus provide the desired inertial stability. In such a situation, referring to FIG. 3, center of gravity 36 would be in the vicinity of center of pressure 38.

When it becomes necessary to control the aerospace vehicle or change course by guidance means, gas generator or fluid valve 50 is actuated by conventional control devices 66 to permit injection of a high temperature gas or liquid through nozzle ports 34 into the exhaust stream from reaction motor 22. Control devices 66, as shown in FIG. 3, are conventional valves positioned in conduits 52. However, it is to be understood that the location and type of control device is a matter of choice within the limits of existing technology.

Typical fluids for injection into the exhaust stream are Freon, which has been found to operate adequately when preheated to a relatively high temperature, and what are commonly known as hot gases. In order to accomplish the preheating of the fluid used for secondary injection, conduits 52 are placed in juxtaposition to nozzle 30 and therefore have the dual effect of preheating the injection fluid as well as cooling nozzle walls 30. In this regard, it is to be understood that conduits 52 may be of substantially flat configuration or could even possibly extend around the periphery of nozzle 30 near throat 32 to form a chamber which would act as a cooler for nozzle 30 and a preheater for the fluid to be injected.

As used herein, injection fluid encompasses high temperature gases as well as liquids.

Solid arrows 68 in FIGS. 4 and 5 show the direction of the exhaust vector caused by secondary injection of a fluid through ports 34. As shown in FIG. 5, the fluid is injected at the lower portion of nozzle 30 and causes the thrust vector to point upward. Although the construction described hereinabove indicates pivotal movement of nozzle 30 in only the plane of the drawings, it is readily apparent that conventional pivoting devices may be utilized whereby nozzle 30 is capable of swiveling and therefore could be moved in any direction by injection of a fluid at ports 34 located about the periphery of the nozzle wall.

Figure 6:
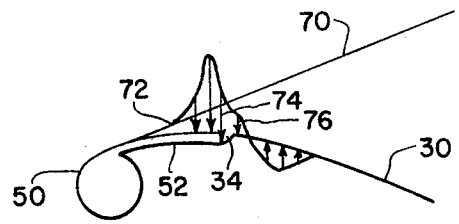
FIG. 6 is a diagrammatic view of the pressures acting on one section of a nozzle during operation of the instant invention.

The injection of a fluid through nozzle ports 34 establishes a pressure configuration or diagram as shown in FIG. 6. Injection of the fluid, especially hot gases, creates a thrust reaction having a substantial pressure just upstream of port 34 and a decrease of pressure just downstream of port 34. This results in a couple effect that also assists in swiveling the nozzle in the desired direction. The increase of pressure of thrust reaction 74 causes shock wave 70 to form just forward of increased pressure 76 and separation 72 of fluid flow in the exhaust stream. Because of the increased pressure caused by thrust reaction 74 and due to separation 72 of the fluid flow, united with shock wave 70, there is a magnification of the thrust reaction which enhances the efficient performance of the control system of the instant invention. Experiments with injection fluids indicate an expansion region occurs downstream of the injection port which also appears to enhance the torque action when hot gases, those of 2,000° F. and above, are utilized.

As indicated by the description of the invention hereinabove, it is readily apparent that the instant secondary injection control system overcomes disadvantages of known systems by avoiding the requirement for development of high temperature materials having an inherently difficult fabrication problem. The instant control system also utilizes the weight required by the gas generator or fluid valves to locate the center of gravity of the nozzle so as to incorporate stability to the system in the absence of the need for control. Thus, it is seen that there is not only a saving of weight and a reduction of fabrication time and problems, but the overall performance of the aircraft is enhanced due to the inherent stability provided by the location of the center of gravity of the nozzle.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A control system for an aircraft propelled by a reaction motor comprising: nozzle means for directing an exhaust stream; means for pivotally mounting said nozzle means; said mounting means located rearward of the center of gravity of said nozzle means; secondary injection means for introducing a jet of fluid into the exhaust stream flowing through said nozzle; and said secondary injection means located for introducing the jet upstream of said means pivotally mounting said nozzle whereby the nozzle orientation is controlled by injecting a fluid into the rocket exhaust stream to establish reaction magnification and thrust vector control.

2. The system of claim 1 wherein the nozzle means are of substantially divergent configuration having a center of pressure rearward of said means for pivotally mounting said nozzle means.

3. The rocket control system of claim 1 wherein said secondary injection means include ports in the walls of said nozzle means with conduit extending therefrom to a pressurized fluid supply.

4. The rocket control system of claim 1 wherein the nozzle means are of substantially divergent configuration having the center of pressure rearward of said means for pivotally mounting said nozzle means; and said secondary injection means include ports in the walls of said nozzle means with conduits extending therefrom to a pressurized fluid supply.

5. The control system of claim 1 wherein damper means prevent vibration and stabilize said nozzle means.

6. The control system of claim 1 wherein seal means extend between said nozzle means and the reaction motor.

7. The control system of claim 1 wherein damper means prevent vibration and stabilize said nozzle means; and seal means extend between said nozzle means and the reaction motor.

8. The control system of claim 6 wherein the seal means are of bellows construction.

9. The control system of claim 7 wherein the seal means are of bellows construction.

10. In a control system for a rocket vehicle, the combination comprising: a thrust chamber having a convergent after portion; a nozzle adjacent said convergent portion having a diameter equal to or greater than the diameter of said convergent portion and having a divergent portion downstream; a damper connected to said thrust chamber and nozzle; said nozzle pivotally mounted from support structure whereby the center of pressure of said nozzle is located downstream of the center of gravity of said nozzle with the pivotal connection therebetween to provide inertial centering of said nozzle; injection ports in the wall of said nozzle between the pivotal connection and center of gravity; gas generator means secured to said nozzle; conduits connecting said ports and generator means; and a bellows seal extending between said thrust chamber and said generator means.

11. A control system for an unstable aerospace vehicle propelled by a reaction motor comprising: nozzle means for directing an exhaust stream; means for pivotally mounting said nozzle means; said mounting means located upstream of the center of gravity of said nozzle means; secondary injection means for introducing a jet of fluid into the exhaust stream flowing through said nozzle means; and said secondary injection means located for introducing the jet upstream of said means pivotally mounting said nozzle means whereby the nozzle orientation is controlled by injecting a fluid into the rocket exhaust stream to establish reaction magnification and thrust vector control as well as inertial stability.

References Cited by the Examiner
UNITED STATES PATENTS

| | | | |
|---|---|---|---|
| 3,016,697 | 1/1962 | Sternberg et al. | 60—35.55 X |
| 3,070,957 | 1/1963 | McCorkle | 60—35.55 |
| 3,101,591 | 8/1963 | Wise | 60—35.54 |
| 3,140,584 | 7/1964 | Ritchey et al. | 60—35.55 |
| 3,147,590 | 9/1964 | Thielman | 60—35.54 |

References Cited by the Applicant
UNITED STATES PATENTS

| | | |
|---|---|---|
| 2,780,059 | 2/1957 | Fiedler. |
| 2,799,990 | 7/1957 | Hausmann. |
| 2,968,921 | 1/1961 | David. |
| 3,020,714 | 2/1962 | Eggers et al. |
| 3,032,982 | 5/1962 | Gaubatz. |
| 3,048,010 | 8/1962 | Ledwith. |
| 3,048,977 | 8/1962 | Geary. |
| 3,144,752 | 8/1964 | Kepler. |

MARK NEWMAN, *Primary Examiner.*

C. R. CROYLE, *Assistant Examiner.*